United States Patent [19]

Choe

[11] 4,112,212
[45] Sep. 5, 1978

[54] ULTRA-HIGH MOLECULAR WEIGHT POLYMETHACRYLOYLOXYBENZOIC ACID AND METHOD OF PREPARATION

[75] Inventor: Eui Won Choe, Randolph, N.J.

[73] Assignee: Celanese Corporation, New York, N.Y.

[21] Appl. No.: 871,282

[22] Filed: Jan. 23, 1978

[51] Int. Cl.$^2$ ............................................. C08F 20/06
[52] U.S. Cl. .................................... 526/234; 526/89; 526/221; 526/240; 526/318
[58] Field of Search ................ 526/326, 318, 240, 89, 526/221, 234

[56] References Cited

U.S. PATENT DOCUMENTS

| 3,290,270 | 12/1966 | Goldberg et al. | 526/326 |
|---|---|---|---|
| 3,687,860 | 8/1972 | Matsuda et al. | 526/326 |
| 3,689,427 | 9/1972 | Matsuda et al. | 526/326 |

*Primary Examiner*—Harry Wong, Jr.
*Attorney, Agent, or Firm*—Benton S. Duffett, Jr.; Kenneth A. Genoni

[57] ABSTRACT

An ultra-high molecular weight methacryloyloxybenzoic acid polymer is provided which, unlike the lower molecular weight polymers of the prior art, is stable even when undergoing melt processing. The method of producing such a polymer involves a free radical polymerization of the monomer at relatively low temperatures in an aqueous solution which contains an alkali metal hydroxide and a free radical initiator.

10 Claims, No Drawings

ULTRA-HIGH MOLECULAR WEIGHT POLYMETHACRYLOYLOXYBENZOIC ACID AND METHOD OF PREPARATION

BACKGROUND OF THE INVENTION

It is known in the art that polymethacryloyloxybenzoic acid having units of the formula:

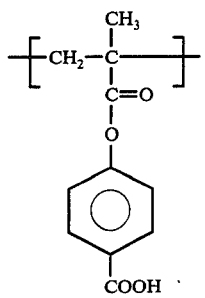

may be produced in the liquid crystalline state by polymerizing the monomer in p-cetyloxybenzoic acid (CBA) or in the liquid state by employing isotropic solvents such as dimethylformamide (DMF). This polymer is described as being a "comb polymer" in that it possesses mesophase forming oxybenzoate side chains depending from a methacrylate backbone. Due to the interaction of these depending sidechains, the polymer displays a smectic arrangement of macromolecules in the mesophase in certain environments. That is, the elongated molecules are found in parallel planes or layers, with the side chains linking across the plane lines.

The prior art methods for producing these polymers are disclosed in Amerik et al, "Polymerization of p-Methacryloyloxybenzoic Acid in Mesomorphic and in Liquid States", *J. Poly Sci.*, Part C, No. 23 pp. 231–238 (1968), the content of which is incorporated by reference in the interest of brevity and clarity. As described therein, the polymer which is produced in the liquid crystalline state has a molecular weight of about 600,000 which corresponds to an intrinsic viscosity of from 0.7 to 0.8. The polymer which results from the liquid state reaction has a molecular weight of about 50,000 and an intrinsic viscosity of about 0.15 dl/g. Similar methods of producing polymethacryloyloxybenzoic are disclosed in: Blumstein et al, "Polymerization of p-Methacryloyloxy Benzoic Acid With Liquid Crystalline Media" in *Liquid Crystals* 3, Part II, pp. 1075–1087 (Brown & Labes, ed., Gordon & Breach Science Pub. Inc., New York, N.Y., 1971); Blumstein et al, "Crystallinity and Order in Atactic Poly (acryloyloxybenzoic acid) and Poly (methacryloyloxybenzoic acid)", *Macromolecules*, Vol. 9, No. 2, pp. 243–247 (March-April 1976); and Blumstein et al, "Oriented Polymer Growth in Thermotropic Mesophases", *Macromolecules*, Vol. 8, No. 1, pp. 73–76 (1975).

Known methods of preparing polymethacryloyloxybenzoic acid suffer from various disadvantages. For example, the polymer produced in a dimethylformamide environment has a low molecular weight (corresponding to an intrinsic viscosity of about 0.15 dl/g when measured in a 0.1% solution of dimethylformamide at 25° C.), while the polymer produced in p-cetyloxybenzoic acid is of an intermediate molecular weight (corresponding to an intrinsic viscosity of about 0.7 dl/g). When calculated as a 0.2% weight solution in 2N NaOH at 25° C., the polymers have an inherent viscosity (I.V.) of less than 0.1 dl/g and 0.25 dl/g, respectively. Due to their relatively low molecular weight, the polymers of the prior art cannot be employed in the production of high strength fibers, plastics or films. In fact, in attempting to produce melt spun fibers from the low and intermediate molecular weight polymers of the prior art, it has been found that such polymers decompose before fibers can be formed.

Furthermore, because the low and intermediate molecular weight polymers exhibit a relatively low viscosity they are unsuitable as flooding agents in oil fields, which require fluids of much higher viscosity.

In addition to the aforementioned disadvantages, the prior art processes for producing polymethacryloyloxybenzoic acid employ non-aqueous solvents which present serious environmental and health hazards. Also, these non-aqueous solvents present economic difficulties in terms of both the cost of the solvent, per se, as well as the costs of solvent recovery and safety precautions. Since the non-aqueous solvents are not totally recoverable, the production cost of the polymer by either of the above-discussed prior art methods would be further increased by the continuous consumption of solvent.

In commonly assigned U.S. Ser. No. 871,280 filed concurrently herewith by Eui Won Choe, and entitled "Polyacryloylaminobenzoic acid, Polymethacryloylaminobenzoic Acid and Method of Preparation", there is described polymers which primarily differ from the polymers of the present invention by having an amino group in lieu of the oxy group. The method of preparing such polymers is also disclosed.

In commonly assigned U.S. Ser. No. 871,281 filed concurrently herewith by Eui Won Choe, Marshall Tan and Robert Mark Mininni, and entitled "Process for Producing Anisotropic Dopes and Articles thereof from Benzoic Acid Derivative Polymers", there is a described anisotropic dopes which are employed in the formation of fibers and the method of preparing the dopes.

The search has continued for high molecular weight methacryloyloxybenzoic acid polymers useful in producing melt spun fibers. This invention was made as a result of that search.

Accordingly, a general object of the present invention is to avoid or substantially alleviate the above identified problems of the prior art.

It is another object of the present invention to provide a high molecular weight polymer.

More specifically, it is an object of the present invention to provide a high molecular weight methacryloyloxybenzoic acid polymer having an inherent viscosity of at least about 1.0 dl/g.

It is another object of the present invention to provide high molecular weight methacryloyloxybenzoic acid polymer which may be formulated into high strength fibers, films and plastics and which may also be used as a flooding agent in oil fields.

Yet another object of the present invention is to provide a relatively inexpensive process for preparing a high molecular weight polymer in an aqueous medium.

Other objects and advantages of the invention will become apparent from the following summary and description of the preferred embodiments of the present invention.

SUMMARY OF THE INVENTION

In one aspect, the present invention provides a high molecular weight polymer capable of forming an anisotropic melt and having the recurring unit:

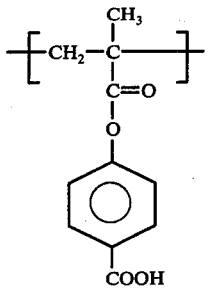

the polymer having an inherent viscosity of at least about 1.0 dl/g when measured as a 0.2% by weight solution in 2 N NaOH at 25° C.

In another aspect, the present invention provides an improved process for preparing a high molecular weight polymer capable of forming an anisotropic melt. This process comprises a. dissolving a monomer having the formula

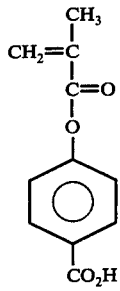

in an aqueous solution of an alkali metal hydroxide and in the presence of a free radical initiator, b. allowing sufficient time for polymerization to occur, and c. recovering the polymer.

The essence of the present invention is the discovery that polymethacryloyloxybenzoic acid having a high molecular weight may be synthesized via a free radical reaction in an aqueous medium.

DESCRIPTION OF PREFERRED EMBODIMENTS

According to the present invention, polymethacryloyloxybenzoic acid having a molecular weight greater than one million and an inherent viscosity (I.V.) of at least 1.0 dl/g when measured as a 0.2% by weight solution in 2N NaOH at 25° C. may be produced.

The polymer of the present invention has ultra-high molecular weight and thus displays unique characteristics which makes is suitable for a variety of purposes, such as the formation of a stable, anisotropic polymer melt which may be either molded, drawn into fibers, or used to produce films. The fibers made using an anisotropic polymer melt are superior to those produced from isotropic melts in that they do not require an after drawing step to enhance the strength of the fibers. Anisotropic fibers thus produced may be further strengthened by employing conventional cross-linking agents such as polyvalent Group II and Group III metal compounds, organic diisocyanates, diamino organic compounds and bisepoxides such as Epirez 508 bisepoxide and Epirez 510 bisepoxide.

The polymers of the present invention may also be utilized as set forth in the aforementioned U.S. patent application Ser. No. 871,281 concurrently filed herewith and entitled "Process for Producing Anisotropic Dopes annd Articles Thereof from Benzoic Acid Derivative Polymers." As described therein, anisotropic spinning dopes of various polymers including polymethacryloyloxybenzoic acid may be prepared by forming a salt of the polymer in an aqueous medium. Fibers which are produced from such dopes are characterized by their transparency, high orientation and crystallinity.

The polymers of the present invention may also be used as flooding agents in oil fields. Large quantities of the highly viscous polymer may be pumped into oil bearing strata at various locations surrounding the producing well. The pressure of the polymer causes oil to flow toward the well where it is recovered.

The methacryloyloxybenzoic acid monomer employed in the production of the polymer may be formed by any conventional method. Typical of such methods is the Shotten-Bauman procedure which involves the addition of methacrylic acid chloride to an aqueous solution of p-hydroxybenzoic acid in accordance with the following reaction:

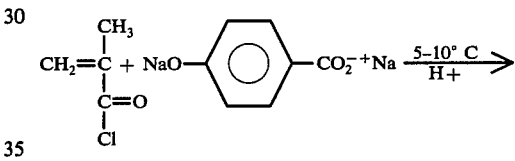

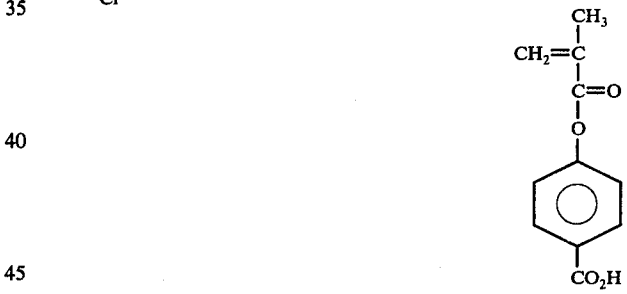

More specifically, p-hydroxybenzoic acid is dissolved in a NaOH solution and the methacrylic acid chloride is added over an extended period of time. After this reaction is completed, the mixture is acidified to give a neutral reaction. The p-methacryloyloxybenzoic acid which is thus produced is separated from the mixture, washed, and recrystallized from methanol. For details of the Shotten-Bauman procedure, see the Amerik et al article at page 232.

The high molecular weight methacryloyloxybenzoic acid polymer of this invention may be formed via the free radical polymerization of an alkali metal salt of methacryloyloxybenzoic acid in water which is free of oxygen gas. As employed in the present specification, the term "high molecular weight polymer" is meant to include both homopolymers of methacryloyloxybenzoic acid and copolymers of methacryloyloxybenzoic acid with minor amounts, i.e., less than about 50% by weight, of other monomers, such as acrylic acid. Other monomers known to those skilled in this art may also be used.

The presence of oxygen will tend to inhibit the polymerization or will terminate the growing polymer radical, thus resulting in a lower molecular weight polymer. To ensure that the reaction environment is kept free of oxygen gas, the reaction mixture is maintained under a blanket of nitrogen or other inert gas such as argon at a positive pressure throughout the polymerization.

The polymer formation is believed to be as follows:

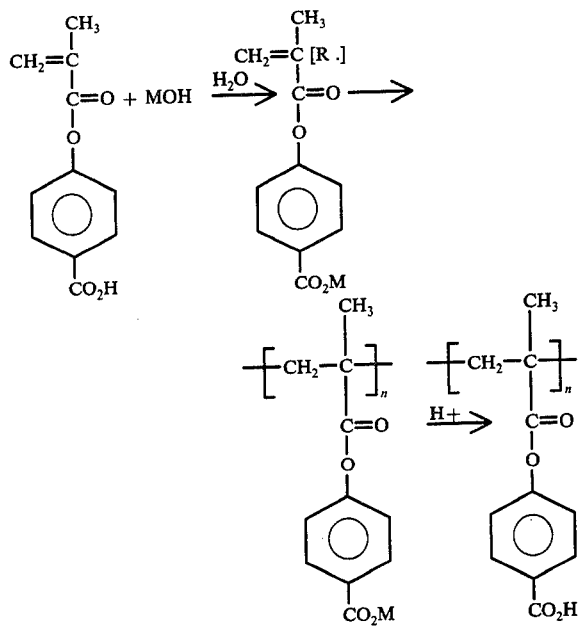

wherein M is an alkali metal such as Li, Na, K, Cs, etc., Na being the preferred alkali metal. It will be apparent from the above reaction that the monomer is initially dissolved in an aqueous solution of an alkali metal hydroxide and is polymerized in the presence of a free radical derived from the free radical initiator.

The methacryloyloxybenzoic acid monomer is present in the reaction mixture in an amount of from about 0.5% to about 30% and preferably from about 5% to about 10%, all by weight of the reaction mixture. While monomer concentrations substantially above 30% may be utilized in forming the polymer, the resulting polymer would have a molecular weight corresponding to an inherent viscosity of less than 1.0 dl/g.

The reaction may be carried out at a temperature of from about −10° C. to about 100° C., typically from about −5° C. to about 50° C., and preferably from about 0° C. to about 5° C. The lower temperatures are preferred inasmuch as these temperatures yield a polymer possessing a higher inherent viscosity. To obtain the desired polymer, it is not necessary to maintain the temperature constant throughout the reaction. Thus, for example, polymerization may be initiated at a temperature of from about 0° C. to about 5° C. and later allowed to rise to room temperature.

To promote the polymerization of the monomer, a free radical initiator must be added to the reaction mixture. The free radical initiator may be present in amounts of from about 0.1% to about 5%, preferably from about 1% to about 2% based on the monomer weight. A preferred free radical initiator is potassium persulfate ($K_2S_2O_8$). However, other known free radical initiators such as ammonium persulfate and mixtures of initiators may also be utilized. After the reaction has been initiated, generally from about 0.05% to about 2.5% and preferably from about 0.5% to about 1.5% based on the monomer weight of sodium bisulfite ($NaHSO_3$), ferrous sulfate ($FeSO_4$) or mixtures thereof may be added to the reaction mixture to accelerate the polymerization. The function of the sodium bisulfite or the ferrous sulfate is to provide free radicals through the dissociation of the free radical initiator, e.g., potassium persulfate. Should such compounds not be added to the reaction mixture, the polymerization reaction would occur at a much slower rate.

The time necessary for the completion of the polymerization is dependent upon reaction parameters such as the temperature, monomer concentration and initiator employed. While no upper time limit has been established, reaction times may be generally from about 1 to about 24 hours, preferably from about 6 to about 8 hours.

Upon completion of the reaction, the polymer is recovered by first precipitating it from solution via the addition of a strong acid. The type of acid is not critical to the operation of the process as long as it serves to precipitate the polymer. Hydrochloric acid is preferred although other acids may also be used. The precipitated polymer is then separated from the remainder of the reaction mixture, washed and dried.

The polymerization process may be operated on a continuous, semi-continuous, or preferably, on a batch basis.

The following Examples are given as specific illustrations of the process. It should be understood, however, that the invention is not limited to the specific details set forth in the Examples.

EXAMPLE 1

Sodium methacryloyloxybenzoate is prepared by dissolving 10 grams of methacryloyloxybenzoic acid in 150 mls of an aqueous solution containing 1.94 grams of sodium hydroxide. Twelve mls of 2N NaOH solution is added in order to obtain a clear solution. To this solution maintained at 0°–5° C. under nitrogen, is added 0.15 grams of potassium persulfate in 7 mls of water, followed after one minute by 0.075 grams of sodium bisulfite in 5 mls of water. After the reaction mixture is held at that temperature for 10 hours, the mixture is allowed to rise to room temperature and is stirred for an additional 16 hours. The reaction mixture is acidified with 100 mls of 20% by weight hydrochloric acid to precipitate the polymer. The polymer is filtered, washed with water, boiled in glacial acetic acid and filtered, washed with water, and then dried at 120° C. and a pressure of 0.1 mm Hg to yield 5.7 grams of polymethacryloyloxybenzoic acid with an inherent viscosity of 1.46 dl/g as measured in a 0.2% by weight solution of 2N NaOH at 25° C. The product has a melting point greater than 330° C. The polymer may be utilized in preparing transparent films and fibers.

EXAMPLE 2

Polymethacryloyloxybenzoic acid is prepared in the same manner as described in Example 1 except that the free radical initiator concentration is reduced to two-thirds of the amount used in the previous Example. The polymer has an I.V. of 1.18 dl/g, and a melting point of about 300° C.

EXAMPLE 3

Polymethacryloyloxybenzoic acid is prepared as described in Example 1 except that the reaction temperature is maintained at 40°–50° C. The inherent viscosity of the polymer is 1.19 dl/g, as measured in a 0.2% by weight solution of 2N NaOH at 25° C.

EXAMPLES 4–11

The polymers of the Examples set forth in Table I are prepared in an analogous manner to those described in Examples 1–3 hereinabove.

TABLE I

| Experiment Number | Monomer Concentration Weight Percent | $K_2S_2O_8$ %* | $NaHSO_3$ %* | T° C | I.V. (dl/g) (2N NaOH) |
|---|---|---|---|---|---|
| 4 | 5.4 | 1.5 | 0.75 | 25 | 0.82–1.06 |
| 5 | 9.25 | 1.5 | 0.75 | 25 | 1.05 |
| 6 | 19.23 | 1.5 | 0.75 | 25 | 0.75 |
| 7 | 5.4 | 1.0 | 0.50 | 0 | 1.18 |
| 8 | 5.4 | 1.5 | 0.75 | 0 | 1.46 |
| 9 | 5.4 | 2.0 | 1.00 | 0 | 1.04 |
| 10 | 5.4 | 1.5 | 0.75 | −10 | 1.12 |
| 11 | 9.25 | 1.5 | 0.75 | 0 | 1.30 |

*%Based on the monomer weight.

Although the methacryloyloxybenzoic acid polymers produced by the method described above may have a molecular weight corresponding to an inherent viscosity lower than about 1.0, it has been found that such polymers exhibit inherent viscosities of generally greater than about 1.0, and preferably from about 1.0 to about 1.5 dl/g.

The high molecular weight polymethacryloyloxybenzoic acid of the present invention is thermotropic and may be converted into a lyotropic system, in water, by neutralization with a base. Unlike the lower molecular weight polymers of the prior art, the polymer of the present invention forms a stable, anisotropic melt at temperatures of from about 293° C. to about 334° C. and crystallizes on cooling at temperatures of from about 280° C. to about 330° C., depending on the molecular weight of the polymer. The stability of the melt is believed to be due to the arrangement of the elongated molecules on parallel planes or layers with interaction of the side chains thus yielding two dimensional order. The thermotropic range for the polymer is about 30° C.

COMPARATIVE EXAMPLES 12–21

In order to illustrate the distinctions between the polymer of the present invention and those of the prior art, a number of comparative runs were undertaken. In contrast to the free radical polymerization reaction in an aqueous medium in the present invention, the polymerization which is believed to occur in both the liquid crystal and the isotropic solvents is as follows:

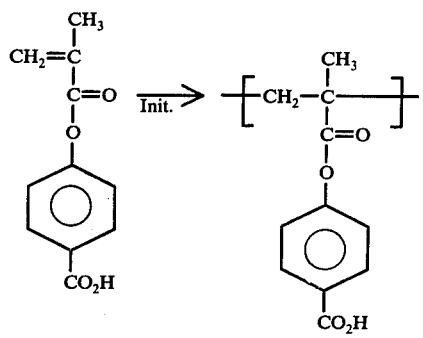

In these Comparative Examples, the kind and concentration of initiators, as well as the polymerization temperature are varied. The results are summarized in Table II:

TABLE II

| Experiment Number | Solvent | Initiator | % Concentration of Initiator Based on Monomer Weight | T° C | Hrs. | I.V.* dl/g |
|---|---|---|---|---|---|---|
| 12 | DMF | $t-Bu_2O_2$ | 0.75 | 110 | 1 | 0.14 |
| 13 | DMF | " | 0.386 | 110 | 1 | 0.15 |
| 14 | DMF | t-BuPB | 1.0 | 115 | 1 | 0.14 |
| 15 | CBA | " | 1.0 | 110 | 1½ | No Rx. |
| 16 | CBA | " | 1.0 | 180 | ½ | 0.63–0.74 0.25(NaOH) |
| | | | | | | Repeat run 0.19 |
| 17 | CBA | " | 0.375 | 110 | 1½ | 0.32 |
| | CBA | " | 0.375 | 180 | ½ | |
| 18 | CBA | DiCupR | 0.375 | 110 | 1½ | 0.29 |
| | CBA | DiCupR | 0.375 | 180 | ½ | |
| 19 | CBA | DiCupR | 0.75 | 110 | 1½ | 0.23 |
| | CBA | DiCupR | 0.375 | 180 | ½ | |
| 20 | CBA | Thermal | — | 220 | | 0.1 |
| 21 | None | Thermal | — | 220 | | 0.2(NaOH) X-link |

*I.V. at 0.1% in DMF containing 1 mole % LiCl.
$t-Bu_2O_2$ = Di-t-butylperoxide
t-BuPB = t-butylperbenzoate
DiCupR = Dicumylperoxide The dual notation in comparative examples 17–19 indicates that the polymerization reaction temperature was maintained at about 110° C. for about 1½ hours and then raised to 180° C. for about ½ hour to yield a polymer having the indicated inherent viscosity.

As may be seen from the asterisk notation, the I.V. values shown (except Example 21) are determined on the basis of a 0.1% by weight solution in dimethylformamide containing 1 mole % lithium chloride. Example 16 shows the correspondence of the I.V. measured in this manner compared to that measured as a 0.2% solution by weight in 2N sodium hydroxide. The I.V. of Example 21 is also measured in sodium hydroxide as indicated in the Table. Thus, it should be emphasized that the polymethacryloyloxbenzoic acid produced via prior art methods possesses an inherent visosity which is indicative of a molecular weight which is far below that of the polymers of the present invention regardless of the kind or concentration of initiator or the reaction temperature.

Although the invention has been described with preferred embodiments, it is to be understood that variations and modifications may be resorted to as will be apparent to those skilled in this art. Such variations and modifications are to be considered within the scope of the following claims.

I claim:

1. A high molecular weight polymer capable of forming an anisotropic melt having the recurring unit:

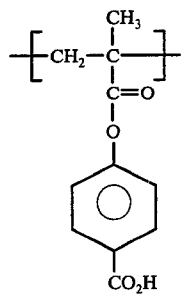

said polymer having an inherent viscosity of at least about 1.0 dl/g when measured as a 0.2% by weight solution in 2N NaOH at 25° C.

2. The polymer of claim 1 wherein the inherent viscosity is from about 1.0 to about 1.5 dl/g.

3. An improved process for preparing a high molecular weight polymer capable of forming an anisotropic melt comprising:

a. dissolving a monomer having the formula

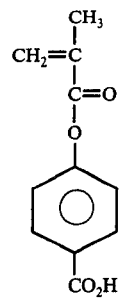

in an aqueous reaction mixture of an alkali metal hydroxide and in the presence of a free radical initiator,
b. allowing sufficient time for polymerization to occur, and
c. recovering the polymer.

4. The process of claim 3 wherein said reaction is carried out in the absence of oxygen gas.

5. The process of claim 3 wherein the temperature of said reaction is from about −10° C. to about 100° C.

6. The process of claim 3 wherein the temperature of said reaction is from about −5° C. to about 50° C.

7. The process of claim 3 wherein the monomer comprises about 0.5% to about 30% by weight of the mixture.

8. A process for preparing a polymer comprising:

a. dissolving from about 5% to about 10% by weight of a monomer having the formula

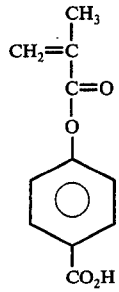

in an aqueous reaction mixture of sodium hydroxide and in the presence of potassium persulfate, said reaction mixture being maintained under a blanket of an inert gas at a temperature of from about 0° C. to about 5° C.,
b. adding an amount of a polymerization accelerator selected from the group consisting of sodium bisulfite and ferrous sulfate,
c. allowing sufficient time for polymerization to occur, and
d. recovering the polymer 9. The process of claim 8 wherein the dissolved monomer comprises from about 5% to about 10% of the total weight of the reaction mixture.

10. The process of claim 8 wherein step (b) comprises the addition of an effective amount of sodium bisulfite.

* * * * *